United States Patent
Xiang et al.

(10) Patent No.: US 9,740,283 B2
(45) Date of Patent: Aug. 22, 2017

(54) DISPLAY METHOD AND ELECTRONIC DEVICE

(71) Applicant: Lenovo (Beijing) Co., Ltd., Beijing (CN)

(72) Inventors: Mei Xiang, Beijing (CN); Jian Lang, Beijing (CN); Xiaoping Zhang, Beijing (CN); Chunlong Yang, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 29 days.

(21) Appl. No.: 14/640,181

(22) Filed: Mar. 6, 2015

(65) Prior Publication Data

US 2016/0077584 A1 Mar. 17, 2016

(30) Foreign Application Priority Data

Sep. 17, 2014 (CN) .......................... 2014 1 0475155

(51) Int. Cl.
*G06F 3/01* (2006.01)

(52) U.S. Cl.
CPC .................. *G06F 3/013* (2013.01)

(58) Field of Classification Search
CPC .......... G06F 3/012; G06F 3/013; G06F 3/014; G06F 3/015; G06F 3/01; G02B 27/01; G02B 27/0093; G02B 27/0101; G02B 2027/0123; G02B 2027/0125; G02B 2027/0127; G02B 2027/0169; G02B 27/017; G02B 27/0172; G02B 27/0179; G02B 2027/0196; G02B 2027/0198
See application file for complete search history.

(56) References Cited

U.S. PATENT DOCUMENTS

| 2005/0047629 | A1* | 3/2005 | Farrell | G06F 3/013 382/117 |
| 2009/0273562 | A1* | 11/2009 | Baliga | G06F 3/013 345/157 |
| 2012/0146891 | A1 | 6/2012 | Kalinli | |
| 2014/0232639 | A1 | 8/2014 | Hayashi et al. | |
| 2014/0250395 | A1 | 9/2014 | Tanaka | |

(Continued)

FOREIGN PATENT DOCUMENTS

| CN | 103885743 A | 6/2014 |
| CN | 103914151 A | 7/2014 |
| CN | 103970499 A | 8/2014 |

(Continued)

OTHER PUBLICATIONS

First Chinese Office Action regarding Application No. 201410475155.0 dated Sep. 9, 2016. English translation provided by http://globaldossier.uspto.gov.

*Primary Examiner* — Lun-Yi Lao
*Assistant Examiner* — Jarurat Suteerawongsa
(74) *Attorney, Agent, or Firm* — Harness, Dickey & Pierce, P.L.C.

(57) ABSTRACT

The disclosure provides a display method and an electronic device. The display method includes: detecting whether display contents are to be displayed via a display unit of the electronic device, determining a first region corresponding to a gazing position of a user on the display unit, determining a second region on the display unit based on the first region, and displaying the display contents in the second region.

15 Claims, 5 Drawing Sheets

(56) References Cited

U.S. PATENT DOCUMENTS

2015/0348550 A1   12/2015  Zhang
2015/0358594 A1*  12/2015  Marshall ................. G06F 3/013
                                                            345/419

FOREIGN PATENT DOCUMENTS

| CN | 103995580 A | 8/2014 |
| CN | 104023270 A | 9/2014 |
| EP | 2762997 A2 | 8/2014 |

\* cited by examiner

US 9,740,283 B2

DISPLAY METHOD AND ELECTRONIC DEVICE

The present application claims the priority of Chinese Patent Application No. 201410475155.0, entitled as "DISPLAY METHOD AND ELECTRONIC DEVICE", and filed with the Chinese Patent Office on Sep. 17, 2014, the contents of which are incorporated herein by reference in its entirety.

FIELD

The present disclosure relates to the field of electronic technology, and in particular to a display method and an electronic device.

BACKGROUND

Currently, display screens are configured in most of electronic devices. Various contents can be displayed via a display screen, hence a user obtains corresponding information when looking over the contents displayed on the display screen and people's daily lives are facilitated greatly.

A display location, for display contents generated by an application, in a display window corresponding to the application has been defined in the development of the application. Therefore, the display location for the display contents generated by the application on the display screen is constant in the case that a display location of the display window corresponding to the application is not changed.

However, a gazing region of the user on the display screen is inconstant. Therefore, a display region for new display contents on the display screen does not fit with a current gazing region of the user.

SUMMARY

The present disclosure provides a display method and an electronic device.

In an aspect of embodiments of the present disclosure, a display method is provided, including: detecting whether display contents are to be displayed via a display unit of an electronic device; determining a first region on the display unit if it is detected that the display contents are to be displayed via the display unit of the electronic device, the first region corresponding to a gazing position of a user on the display unit; determining a second region on the display unit based on the first region; and displaying the display contents in the second region.

Optionally, the determining the second region based on the first region on the display unit may include: acquiring a display parameter of the display contents; determining a second location parameter based on a first location parameter of the first region and the display parameter; and determining the second region based on the second location parameter.

Optionally, before determining the second region based on the first region on the display unit, the method may further include: judging the type of the display contents; and determining the second region on the display unit based on the first region includes: determining, on the display unit, a region overlapping with the first region as the second region if the display contents are a first type of information; or determining, on the display unit, a region not overlapping with the first region as the second region if the display contents are a second type of information different from the first type of information.

Optionally, the judging the type of the display contents may include: judging whether the display contents are generated in response to an input operation from a user, determining the display contents to be the first type of information if it is judged that the display contents are generated in response to the input operation from the user, or determining the display contents to be the second type of information if it is judged that the display contents are generated not in response to the input operation from the user.

Optionally, displaying the display contents in the second region may include: maintaining a currently-displayed contents on the display unit and displaying the display contents in the second region, wherein a portion of the currently-displayed contents is occluded by the display contents in the case that the portion is overlapping with a display location for the display contents.

Optionally, the displaying the display contents in the second region may include: displaying the display contents in the second region in a window corresponding to an application on which the user performs the input operation, if the display contents are generated in response to the input operation from the user.

Optionally, before the displaying the display contents in the second region in the window corresponding to the application on which the user performs the input operation, the method may further include: enlarging a display region of the window to enable the window with the enlarged display region to contain the second region if the window does not contain the second region.

Optionally, before the displaying the display contents in the second region in the window corresponding to the application on which the user performs the input operation, the method may further include: changing a display location of the window to enable the window to contain the second region and moving a predetermined region in the window for displaying the display contents to the second region, if the window does not contain the second region.

Optionally, before the displaying the display contents in the second region in the window corresponding to the application on which the user performs the input operation, the method may further include: terminating displaying an original content in the second region or displaying the original content in a third region other than the second region in the window, if the original content is displayed on the second region in the window.

The other aspect of the embodiments of the present disclosure provides an electronic device, including: a detection module for detecting whether display contents are to be displayed via a display unit of the electronic device; a first determination module for determining a first region on the display unit, the first region corresponding to a gazing position of the user on the display unit; a second determination module for determining a second region on the display unit based on the first region; and a display module for displaying the display contents in the second region.

Optionally, the second determination module may be configured to acquire a display parameter of the display contents, determine a second location parameter based on a first location parameter of the first region and the display parameter, and determine the second region based on the second location parameter.

Optionally, the electronic device may further include a judging module for judging the type of the display contents; wherein the second determination module is configured to: determine, on the display unit, a region overlapping with the first region as the second region if the display contents are a first type of information or determine, on the display unit, a region not overlapping with the first region as the second region if the display contents are a second type of information different from the first type of information.

Optionally, the judging module may be configured to judge whether the display contents are generated in response to an input operation from a user, determine the display contents to be the first type of information if the display contents are generated in response to the input operation from the user, or determine the display contents to be the second type of information if the display contents are generated not in response to the input operation from the user.

Optionally, the display module may be configured to maintain currently-displayed contents on the display unit and display the display contents in the second region; wherein a portion of the currently-displayed contents is occluded by the display contents in the case that the portion is overlapping with a display location for the display contents.

Optionally, the display module may be configured to display the display contents in the second region in a window corresponding to an application on which the user performs the input operation if the display contents are generated in response to the input operation from the user.

Optionally, the electronic device may further include a first window adjustment module for enlarging a display region of the window to enable the window with the enlarged display region to contain the second region if the window does not contain the second region.

Optionally, the electronic device may further include a second window adjustment module for changing a display location of the window to enable the window to contain the second region and moving a predetermined region in the window for displaying the display contents to the second region, if the window does not contain the second region.

Optionally, the electronic device may further include display contents adjustment module for terminating displaying an original content in the second region or displaying the original content in a third region other than the second region in the window, if the original content is displayed on the second region in the window.

Optionally, the first and second determination modules constitute a single processor.

BRIEF DESCRIPTION OF THE DRAWINGS

The drawings to be used in the description of the embodiments will be described briefly as follows, so that the technical solutions according to the embodiments of the present disclosure will become clearer. It is obvious that the drawings in the following description only illustrate some embodiments of the present disclosure. For those skilled in the art, other drawings may be obtained according to these drawings without any creative work.

DETAILED DESCRIPTION

To solve the technical problem in the conventional technologies that a user needs to move his sight to watch display contents on a display screen, a display method is provided according to embodiments of the present disclosure. In the method, when displaying display contents, the electronic device determines a display region for the display contents based on a current gazing region of the user, so that the display region for the display contents fit with the current gazing region of the user and it is convenient for the user to obtain information.

In the following, the technical schemes according to the present disclosure are described in detail in conjunction with the drawings and specific embodiments. It should be understood that, the embodiments according to the present disclosure and specific features in the embodiments intend to illustrate in detail but not limit the technical schemes according to the present disclosure. In case of non-conflict, the embodiments according to the present disclosure and the technical features in the embodiments may be combined with each other.

First Embodiment

Figure 1:
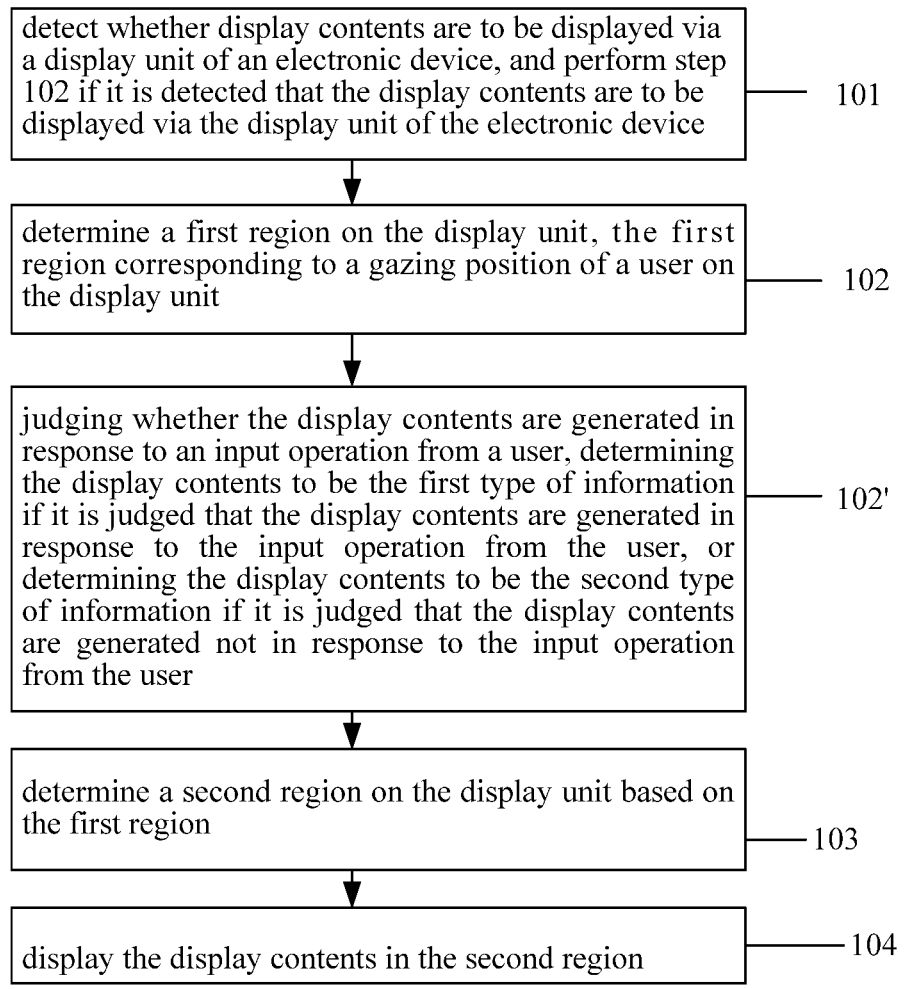
FIG. 1 is a flowchart of a display method according to a first embodiment of the present disclosure.

A display method is provided according to the first embodiment of the present disclosure, which is adapted to an electronic device having a display unit, such as a smart phone, a smart watch, a laptop, a laptop computer and a smart television. Referring to FIG. 1 which is a flowchart of the display method, the flow includes steps as follows.

In step 101, it is detected whether display contents are to be displayed via the display unit of the electronic device, and step 102 is performed if it is detected that the display contents are to be displayed via the display unit of the electronic device.

Specifically, when forming new display contents, the electronic device needs to send a display request including information related to the display contents to a control module; hence the control module generates a display instruction in response to the display request to instruct the display unit to display corresponding display contents. Therefore, the electronic device is capable of determining whether to display the display contents via the display unit of the electronic device depending on whether the control module receives the display request. In an implementation, the control module may be an integrated chip (e.g. a general processor), or a single-chip.

In step 102, a first region on the display unit is determined, the first region corresponding to a gazing position of a user.

Specifically, an image containing eyes of the user can be acquired by means of an image acquisition unit (such as a front camera) on the electronic device or an external image acquisition apparatus which transmits data with the electronic device. Then, the first region at which the user currently gazes is determined based on a gazing position of the user as derived from the acquired image. The geometrical shape of the determined first region is not limited in the embodiment of the present disclosure and may be a circular shape, a square shape, an ellipse shape or the like. Determining the gazing region of the user based on the image containing the eyes of the user will not be described in detail herein since it is well-known.

In step 102', it is judged whether the display contents are generated in response to an input operation from a user, the display contents are determined to be the first type of information if the display contents are generated in response to the input operation from the user or the display contents are determined to be the second type of information if the display contents are generated not in response to the input operation from the user.

In step 103, a second region is determined on the display unit based on the first region.

Specifically, in step 103, based on the gazing region of the user, the second region is determined to be the display region for the display contents, so that the display region for the display contents fit with the gazing region of the user. In an implementation, step 103 includes two situations as follows depending on a location relationship between the first and second regions.

Figure 2A:
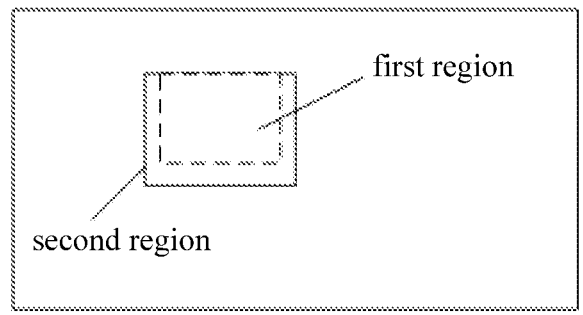
FIG. 2a is a schematic diagram in which a second region overlaps with a first region.

1. Referring to FIG. 2a, a region overlapping with the first region on the display unit is determined as the second region. In the embodiment of the present disclosure, "overlapping" may include the following modes: a mode that the first region completely overlaps with the second region; a mode that the centers of the first and second regions are aligned, and the first and second regions have different sizes or shapes; a mode that a certain side edge or side end of the first region is aligned with a certain side edge or side end of the second region, with the remaining portions of the first region not all overlapping with the remaining portions of the second region; or other overlapping mode in the conventional technologies.

The user does not need to move or just moves slightly his sight to watch the newly-formed display contents directly and conveniently by determining the second region overlapping with the first region to be the display region for the display contents. Since the time for the user to move his sight to look for the new display contents are saved, the speed of acquiring information by the user is improved, the amount of information acquired by the user in a unit time is increased and the efficiency of acquiring the information by the user is improved.

Figure 2B:
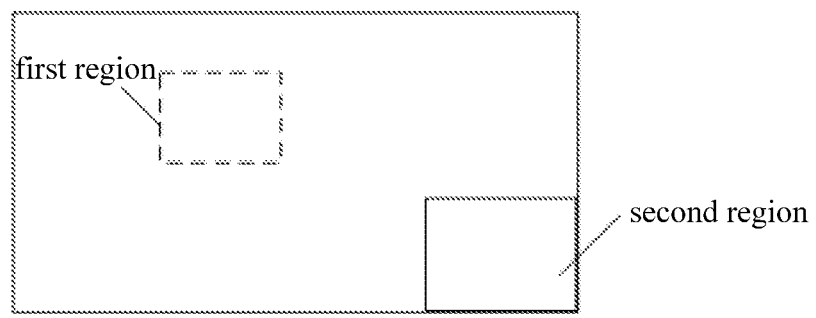
FIG. 2b is a schematic diagram in which a second region does not overlaps with a first region.

2. Display contents that the user needs to or wants to obtain is processed in the same way as the above. However, referring to FIG. 2b, for display contents that the user does not need or temporarily does not want to watch, a region not overlapping with the first region on the display unit is determined as the second region, and the newly-formed display contents are displayed in a region other than the current gazing region of the user, so that the user is not obstructed to watch a displayed contents in the first region.

With the above different display strategies, the display region for the display contents may fit with a requirement of the user. Specifically, the user may watch a newly-formed display contents without moving his sight if the newly-formed display contents are contents which the user needs to or wants to obtain. And the newly-formed display contents are displayed in a region other than the gazing region of the user, so as not to obstruct the user to watch the contents in the current gazing region, if the newly-formed display contents are contents which the user does not need or temporarily does not want to watch.

In step 104, the display contents are displayed on the second region.

Specifically, in an implementation of step 104, the display contents may be displayed at the location of a second region in a current window, or may be displayed by newly establishing a display window at the location of a second region, or may be displayed at the location of a second region in a window after a display location of the window is moved and a display region in the window is moved to the second region.

In the above technical schemes according to the embodiment of the present disclosure, if the electronic device detects that display contents need to be displayed, it firstly determines a current gazing region of a user on the display unit, then determines a display region for the display contents based on the gazing region of the user. Therefore, the display region for the display contents fit with the current gazing region of the user, and it is convenient for the user to acquire information.

Further, based on factors to which references are made in determining the second region, step 103 includes two implementations as follows.

1. A second region with a set size is determined based on the first region.

Specifically, the size of the display region of the second region has already been set. After the location of the first region is determined, a region completely coinciding with the first region, a region with a set size having its center coinciding with the center of the first region, or a region with a set size having its top end (upper end) aligning with the top end (upper end) of the first region, may be determined as the second region.

In step 104, a display parameter of the display contents may be adjusted to be adapted to the size of the second region when the display contents are displayed in the second region. For example, the display contents are predetermined to be displayed in font 5 in the second region, but if the number of characters in the display contents is large, the words may spill over when being displayed in font 5, then a smaller font is used and the display contents can be completely displayed within the second region. Other display parameters may be adaptively adjusted in a way similar to the adjustment of the font, and will not be enumerated one by one herein.

Besides, in step 104, the display contents may also be displayed with a predetermined parameter in the second region. If the display contents can not be completely displayed in the second region, a portion starting from the beginning of the display contents, which can be displayed within the second region, is displayed in the second region, so that the user can watch contents at the beginning of the display contents and obtain the summary of the display contents.

By presetting the size of the second region, not only the amount of calculation for executing step 103 and the time consumption are reduced, but also the continuity and consistency of the display style can be ensured.

2. The second region is determined in conjunction with a display parameter of the display contents.

Specifically, step 103 includes the following steps: acquiring a display parameter of the display contents; determining a second location parameter based on a first location parameter of the first region and the display parameter; and determining a second region based on the second location parameter.

The second region is determined in conjunction with the display parameter of the display contents. The display parameter may include the font size, the layout mode, the alignment mode, the line spacing and the like of the display contents. The display parameter may be obtained from a display request corresponding to the display contents. Then a location parameter of the second region may be determined in conjunction with a location parameter of the first region determined in step 102, and thereby the display effect of each contents in the second region can be improved.

Figure 3:
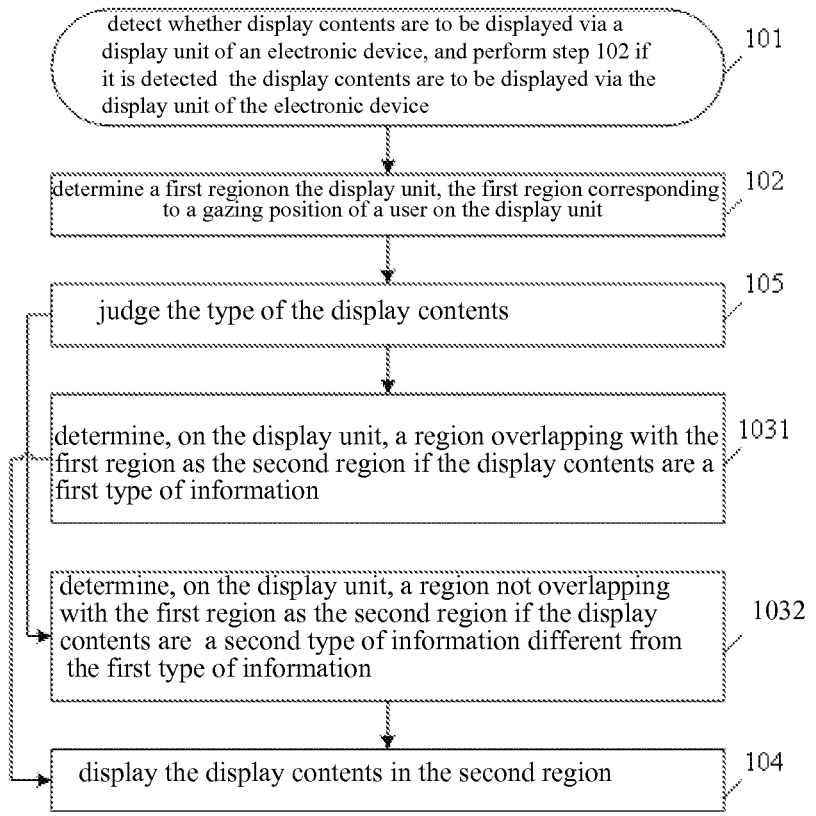
FIG. 3 is a further detail flowchart of the display method according to the first embodiment of the present disclosure.

Further, in step 103, for different types of display contents, determined location relationships between the first and second regions may be different. Specifically, referring to FIG. 3, before step 103, the display method further includes:

Step 105: judging the type of the display contents.

Thus in step 103: determining the second region on the display unit based on the first region includes:

step 1031: determining, on the display unit, a region overlapping with the first region as the second region if the display contents are a first type of information; or step 1032: determining, on the display unit, a region not overlapping with the first region as the second region if the display contents are a second type of information different from the first type of information.

The display contents may be classified into two types. For one type of display contents, the determined second region overlaps with the first region, and for the other type of display contents, the determined second region does not overlap with the first region. The first type of information may be understood as information the user needs to or wants to obtain and the second type of information may be understood as information the user does not need or temporarily does not want to obtain. In the embodiment of the present disclosure, the type of the display contents may be determined with strategies as follows.

In strategy 1, it is judged whether the display contents are generated in response to an input operation from a user, the display contents are determined to be the first type of information if the display contents are generated in response to the input operation from the user or the display contents are determined to be the second type of information if the display contents are generated not in response to the input operation from the user.

Specifically, the display contents may be generated due to the input operation from the user, or may be independent of the input operation from the user but generated by the electronic device itself under a certain working condition (for example, a prompting contents generated when the electronic device completes charging), or may be generated due to a network push.

The display contents generated in response to the input operation from the user may be considered as information that the user wants to obtain and classified into a first type of information and displayed in a gazing region of the user or in a region close to the gazing region. Hence the user may watch the display contents directly and conveniently without moving his sight or by moving his sight slightly and the efficiency of acquiring information by the user is improved.

However, the display contents generated not in response to the input operation from the user, which may be considered as information that the user temporarily does not wants to obtain, is displayed in a region other than the current gazing region of the user, so as not to obstruct the user to watch the contents displayed in the current gazing region.

In an implementation, the display contents generated in response to the input operation from the user includes but not completely includes: a searching result generated when the user performs a searching operation (including a voice searching), a certain contents called when the user perform a certain operation, such as a start menu interface called when the user presses a "win" key, a task manager interface called when the user presses a key combination "Ctrl+Alt+Delete", or a text editing window interface called when the user edits a text.

In strategy 2, it is judged whether to display the display contents in an existing window. The display contents are determined to be the first type of information if it is judged to display the display contents in the existing window, and the display contents are determined to be the second type of information if it is judged not to display the display contents in the existing window.

Specifically, if the display contents need to be displayed in the existing window, it is indicated that the display contents are generated by an application corresponding to the existing window. Since the user is currently concerning the application corresponding to the existing window, the display contents may be considered as information the user wants to obtain; hence it is determined to be the first type of information and is displayed in the gazing region of the user or a region close to the gazing region.

However, if the display contents need to be displayed in a newly established window other than the existing window, it is indicated that the display contents are generated by an application different from the application the user is currently concerning. Then the display contents may be considered as information the user temporarily does not want to obtain, then it is determined to be the second type of information and is displayed in a region other than the gazing region of the user.

In strategy 3, it is judged whether an application corresponding to the display contents are a first type of application or a second type of application. The display contents are determined to be the first type of information if the application is the first type of application, and the display contents are determined to be the second type of information if the application is the second type of application.

Specifically, applications in the electronic device may be classified into two types. Display contents generated by the first type of application is information the user needs to or wants to obtain, and may be displayed in the current gazing region of the user or a region close to the gazing region, so as to be convenient for the user to watch. And display contents generated by the second type of application is information the user does not need or temporarily does not want to obtain, and may be displayed in a region other than the gazing region of the user, so as not to obstruct the user to watch the displayed contents in the current gazing region.

In an implementation, whether an application is the first or second type may be set by the user himself. For example, the user may set a certain news client as the first type of application if he hopes to timely obtain news pushed by the news client, then the user is capable of timely viewing latest news in the current gazing region once it is pushed by the news client, thereby the user may acquire information conveniently.

Moreover, the application may also be classified automatically by the electronic device based on the type and attributes of the application and the operation history and preference information of the user. For example, if a certain application generates display contents in a pop-window way and each time the user closes the pop window in a set short time, it is indicated that the user does not want to watch the contents in the pop-window generated by the application, and the electronic device may classified the application into the second type of application by analyzing the above historical operation data, so that the display contents generated by the application does not obstruct the user to watch the displayed contents in the current gazing region. For another example, if a certain application is an alarm clock application, prompt information generated by the alarm clock is information the user wants to obtain, therefore, the electronic device may intelligently classified the application into the first type of application, so that it is convenient for the user to acquire alarm clock prompt information in time.

In strategy 4, it is judged whether display contents are generated by a set application or is set information generated by the set application. The display contents are determined to be the first type of information if the display contents are generated by the set application or is set information generated by the set application, and the display contents are determined to be the second type of information if the display contents are not generated by the set application or is not set information generated by the set application.

Specifically, strategy 4 is a prefer embodiment by improving strategy 3 and it is different from strategy 3 in that: a portion of display contents generated by an application is information a user wants to obtain, and other portions of the display contents generated by the same application is information that the user temporarily does not want to obtain.

For example, in the case that display contents are generated by an instant communication program, if the display contents are information sent from a good friend which a user of the instant communication program is concerned about, the display contents may be classified into the first type of information and is displayed in a current gazing region of the user or a region close to the gazing region, so that it is convenient for the user to obtain the information sent from the concerned good friend; however, if the display contents are information sent from other users which the user is not concerned about, the display contents may be classified into the second type of information and displayed in a region other than the current gazing region of the user, so as not to obstruct the user from watching a contents displayed in the current gazing region.

Optionally, for the display contents which is the second type of information, a region located at an edge of the screen other than the first region may be determined as the second region, and the user is less affected in watching the contents displayed in the current gazing region since the display contents are displayed in the edge region of the screen other than the gazing region of the user.

In addition, in the embodiment of the present disclosure, step 105 is performed before step 103 and is specifically performed at the same time when step 101 is performed. That is, the processing module may determine that the display contents is detected and determine the type of the display contents at the same time when receiving a display request. Step 105 may also be performed after step 101. There is no strict time sequence relationship between steps 105 and 102, that is, step 105 may be performed before or after step 102, or at the same when step 102 is performed.

Further, depending on whether the display contents are displayed in a current display window, step 104 includes two cases as follows.

In case 1, currently-displayed contents on the display unit is maintained and display contents are displayed in the second region. In this case, a portion of the currently-displayed contents which overlaps with the display location for the display contents are occluded by the display contents.

Specifically, the display contents may be displayed in a window newly established at the location of the second region. The display contents in the newly-established window is displayed on top of the window to occlude an original contents displayed at the display location for the display contents before step 104, without affecting the display of an original contents displayed at other locations on the display unit and without obstructing the user from watching the original contents displayed at other locations on the display unit.

In case 2, the display contents are displayed in the second region in a window corresponding to an application corresponding to an input operation from a user if the display contents are generated in response to the input operation from the user.

Specifically, in the case that the display contents are generated in response to an input operation performed on a first application by the user, the display contents are displayed in a first window of the first application, and specifically, it is displayed at the location of the second region in the first window. By displaying the display contents at the second region in the first window, not only the display location for the display contents may fit with a current gazing region of the user, but also the user may obtain the application generating the display contents at the same time. Hence the user is capable of getting multiple types of information causing the display contents (for example, the user is capable of watching a searching key word on a searching program interface in the case that the display contents are a searching result generated by a searching operation), which helps the user to understand the display contents more completely.

Figure 4A:
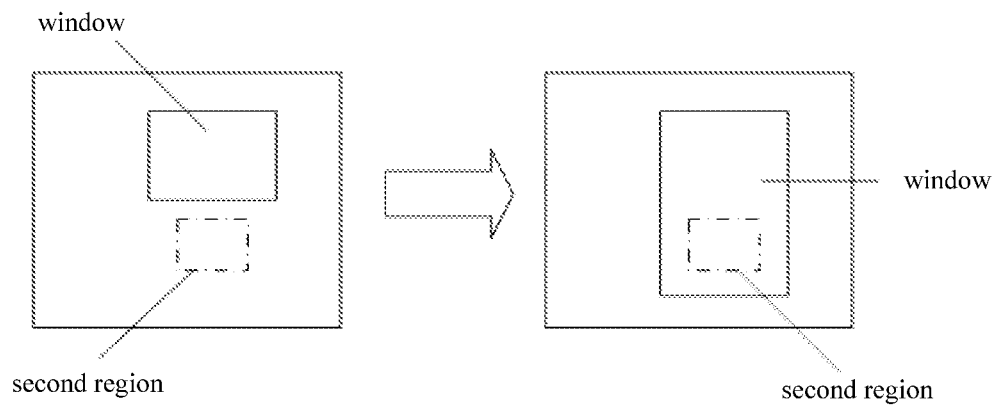
FIG. 4a is a schematic diagram of a display region of an adjustment window according to the first embodiment of the present disclosure.
Figure 4B:
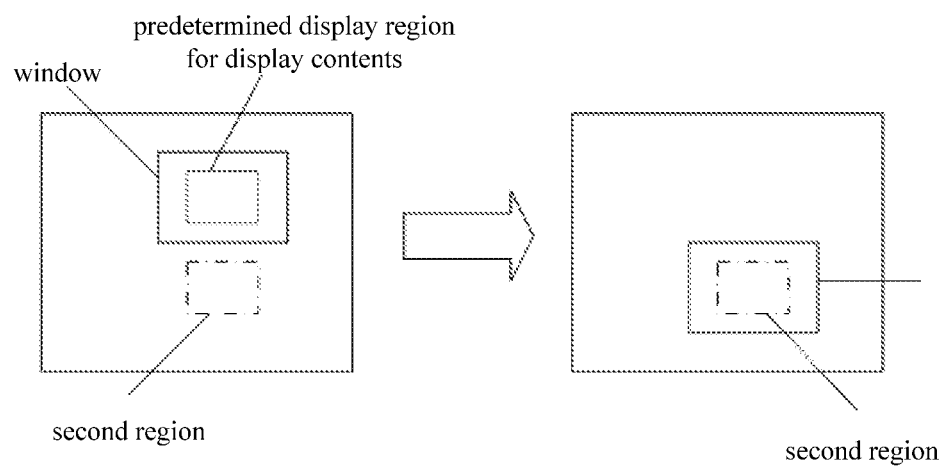
FIG. 4b is a schematic diagram of a display location of an adjustment window according to the first embodiment of the present disclosure.

In actual, if the window corresponding to the application on which the input operation is performed does not contain the second region, it may be processed in the following two ways:

1. referring to FIG. 4a, enlarging the display region of the window to enable the window with the enlarged display region to contain the second region; and 2. referring to FIG. 4b, changing the display location of the window to enable the window to contain the second region and to enable a region in the window which is predetermined for displaying the display contents to move to the second region.

Specifically, in the case that the display contents are displayed in the window corresponding to the application on which the input operation is performed, the display location for the display contents in the window has been determined in the development of the application. For example, the display contents may be predetermined to be displayed in a middle region in the window. If the window does not contain the second region currently, the entire window may be moved to contain the second region, and a region on the left side of the window which is predetermined for displaying the display contents are moved to the second region. Hence the display contents may be displayed at the location of the second region in the window.

In summary, a region for displaying the display contents may be determined in a window based on the first region by combining the location of a first region and a window on which an input operation causing the display contents are performed. If the window does not originally contain a second region determined based on the first region, the size of the window may be changed to contain the second region, or the location of the window may be changed to move a region in the window predetermined for displaying the display contents to the second region, hence the display contents are displayed in the second region in the window.

Further, in the case that an original contents is displayed at the location of the second region in the window corresponding to the application on which the input operation is performed, step 104 may be performed in the following way: terminating displaying the original contents in the second region or displaying the original contents in a third region other than the second region in the window.

Specifically, in order to display the display contents at the location of the second region in the window, it is necessary to clear the original contents displayed at the location. The original contents may be directly terminated from being displayed or may be moved to other locations in the window to be displayed, so that it is avoided that the original contents displayed at the second region overlaps with the display contents, and it is further avoided affecting the user in acquiring information.

In order to understand the present disclosure more clearly, in the following, the flowchart of the above display method according to the embodiment of the present disclosure is described in detail in conjunction with specific application examples.

First application example, a situation in which display contents are generated from a searching operation performed by a user.

Firstly, the user retrieves corresponding contents by performing a searching operation. The electronic device retrieves the corresponding contents in response to a searching key word input by the user, generates a searching result and detects that the searching result is display contents.

Next, the electronic device may acquire an image of eyes of the user and determine a first region at which the user currently gazes based on the image of eyes of the user.

Then, the electronic device is to determine a second region for displaying the searching result based on the determined first region. The electronic device firstly needs to determine the type of the display contents, with which it is determined whether the second region overlaps with the first region. Since the searching result is generated in response to the searching operation of the user, it may be determined that: the searching result to be displayed is the first type of information; and the second region overlaps with the first region and is in an interface of the application on which the searching operation is performed. Finally, the searching result is displayed in the second region in the window.

Taking an electronic device which is installed with the Windows operating system for example, when the user inputs the key word in a searching column on the right upper side of a folder window, the electronic device determines that the second region overlaps with the first region and still should display the searching result in the folder window. Since a gazing region of the user is near the searching column of the folder window when the user performs the input operation, it may be determined that a region, in a file display region, close to the searching column in the folder window is the second region, that is, a right upper region in the file display region in the folder window is the second region where the searching result is displayed.

When the user searches by performing a voice input, there may be no searching column displayed on the display interface, therefore, the gazing region of the user is generally unfixed. The determined second region overlaps with the first region, and the location of the second region depends on the location of the first region.

With the above example, when searching a file on the desktop or in a certain interface, the user only needs to input a searching key word without traversing each application icon or document with his eyes, then the electronic device may display a searching result in the gazing region of the user or a region close to the gazing region. Hence the user is capable of finding out the needed file quickly and intuitively.

A second application example, a situation in which an application on the electronic device generates push information.

Firstly, the electronic device detects that news pushed by an application is display contents, then determines a first region on the display unit at which the user currently gazes, and then judges the type of the display contents. Since the display contents are generated by the application and are independent of a current operation of the user, the display contents are determined to be the second type of information and a display region farthest from the first region on the display region of the display unit is determined as the second region. Since there is no window corresponding to the application generating the push contents displayed on the current interface, a new window is established at the location of the determined second region, in which the push news is displayed. The original contents displayed at the location of the second region are occluded by the push news.

With the above example, if it is detected that the display contents are not initiated by the operation of the user, it may be determined that the user currently does not want to watch the display contents. The display contents are displayed in a region other than the gazing region of the user so as not to interfere the user watching the contents currently displayed in the gazing region.

Second Embodiment

Figure 5:
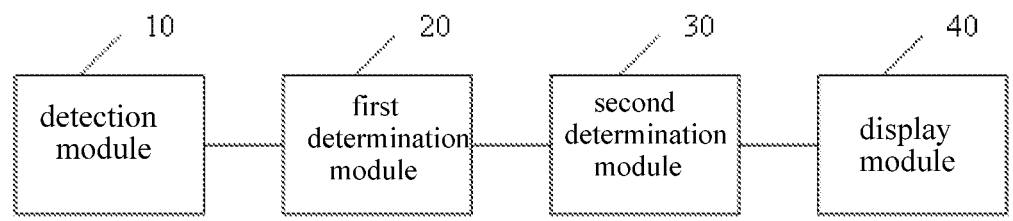
FIG. 5 is a schematic block diagram of an electronic device according to a second embodiment of the present disclosure.

Based on the same technical concept, an electronic device is provided according to the second embodiment of the present disclosure. Referring to FIG. 5 which is a schematic block diagram of the electronic device, the electronic device includes:

a detection module 10, for detecting whether to display contents via a display unit of the electronic device;

a first determination module 20, for determine a first region, at which a user currently gazes, on the display unit;

a second determination module 30, for determining a second region on the display unit based on the first region; and a display module 40, for displaying the display contents in the second region. It should be appreciated that the first and second determination modules 20, 30 constitute a single processor of the electronic device.

In the embodiment of the present disclosure, in the case that the electronic device detects display contents need to be displayed, the electronic device firstly determines a current gazing region of a user on the display unit, then determines a display region for the display contents based on the current gazing region of the user. Hence the display region of the display contents fit with the current gazing region of the user, and the user can watch the display contents without moving his sight or only by moving his sight slightly. Therefore, it is convenient for the user to acquire information.

Further, the second determination module 30 is for: acquiring a display parameter of the display contents, determining a second location parameter based on a first location parameter of the first region and the display parameter, and determining the second region based on the second location parameter.

Figure 6:
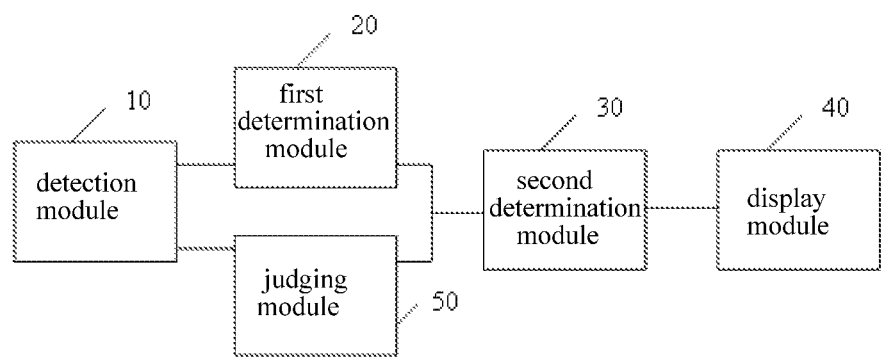
FIG. 6 is a detailed schematic block diagram of the electronic device according to the second embodiment of the present disclosure.

Further, referring to FIG. 6, the electronic device further includes:

a judging module 50, for judging the type of the display contents;

wherein the second determination 30 is for: determining, on the display unit, a region overlapping with the first region as the second region if the display contents are a first type of information; or determining, on the display unit, a region not overlapping with the first region as the second region if the display contents are a second type of information different from the first type of information.

Further, the judging module 50 is for: judging whether the display contents are generated in response to an input operation from a user, determining the display contents to be the first type of information if the display contents are generated in response to the input operation from the user, or determining the display contents to be the second type of information if the display contents are generated not in response to the input operation from the user.

Further, the display module 40 is for maintaining a currently-displayed contents on the display unit and displaying the display contents in the second region; wherein a portion of the currently-displayed contents which has a display location overlapping with a display location for the display contents are occluded by the display contents.

Further, the display module 40 is for displaying the display contents in the second region in a window corresponding to an application on which the user performs the input operation if the display contents are generated in response to the input operation from the user.

Further, the electronic device further includes:

a first window adjustment module, for enlarging a display region of the window to enable the window with the enlarged display region to contain the second region if the window does not contain the second region Further, the electronic device further includes:

a second window adjustment module, for changing a display location of the window to enable the window to contain the second region and moving a region in the window predetermined for displaying the display contents to the second region, if the window does not contain the second region.

Further, the electronic device further includes:

display contents adjustment module, for terminating displaying an original contents in the second region or display the original contents in a third region other than the second region in the window, if the original contents is displayed on the second region in the window.

Various display modes in the display method and specific examples according to the first embodiment are adapted to the electronic device according to the embodiment. With the detail description of the display method in the aforementioned embodiment, the implementation of the electronic device according to the embodiment may be understood by those skilled in the art clearly and will not be described in detail herein to simplify the specification.

One or more technical schemes according to the embodiment of the present disclosure at least have technical effects or advantages as follows.

1. In the embodiment of the present disclosure, when detecting display contents needs to be displayed, the electronic device firstly determines a current gazing region of a user on the display unit, then determines a display region for the display contents based on the current gazing region of the user. In this way, the display region for the display contents fit with the current gazing region of the user, and it is convenient for the user to acquire information.

2. In the embodiment of the present disclosure, the user is capable of watching a newly-formed display contents without moving his sight if the newly-formed display contents are contents the user needs to or wants to obtain. And the newly-formed displayed contents are displayed in a region other than the gazing region of the user, so as not to obstruct the user watching contents in the current gazing region, if the newly-formed display contents are contents that the user does not need or temporarily does not want to watch.

It should be understood by those skilled in the art that, the embodiments of the present disclosure may be provided as a method, a system or a computer program product. Therefore, the present disclosure may be implemented in a form of complete hardware, complete software or a combination of hardware and software. In addition, the present disclosure may be implemented in a form of a computer program product implemented on one or more computer available storage mediums (including but not limited to a magnetic disk memory, a CD-ROM and an optical memory) containing computer available program codes.

The present disclosure is described by making reference to the flowcharts and/or block diagrams of the methods, devices (system) and computer program products according to the embodiments of the present disclosure. It should be understood that each flow and/or block in the flowcharts and/or the block diagrams, and a combination of the flows and/or the blocks in the flowcharts and/or block diagrams may be implemented via computer program instructions. These computer program instructions may be provided to a general computer, a special-purpose computer, an embedded processor or a processor of other programmable data processing device to generate a machine. Hence apparatuses for implementing functions defined in one or more flows in the flowcharts and/or in one or more blocks in the block diagrams are generated by the instructions executed by a computer or the processors of other programmable data processing device.

These computer program instructions may also be stored in a computer readable storage capable of directing the computer or other programmable data processing device to work in a certain mode, so that the instructions stored in the computer readable storage generates a manufacture including an instruction apparatus which implements functions defined in one or more flows in the flowcharts and/or one or more blocks in the block diagram.

Specifically, the computer program instructions corresponding to the information processing method according to the embodiments of the present disclosure may be stored in a storage medium such as an optical disk, a hard disk or a U disk. The computer program instructions corresponding to the information processing method in the storage medium includes the following steps when being read or executed by an electronic device:

detecting whether display contents are to be displayed via a display unit of the electronic device;

determining a first region on the display unit if it is detected that the display contents are to be displayed via the display unit of the electronic device, the first region corresponding to a gazing position of a user on the display unit;

determining a second region on the display unit based on the first region; and displaying the display contents in the second region.

Optionally, the computer instructions stored in the storage medium corresponding to step: determining the second region on the display unit based on the first region, includes the following steps when being executed:

acquiring a display parameter of the display contents;

determining a second location parameter based on a first location parameter of the first region and the display parameter; and determining the second region based on the second location parameter.

Optionally, other computer instructions further stored in the storage medium are executed before executing the computer instructions corresponding to following step: determining the second region on the display unit based on the first region, including the following step: judging the type of the display contents; and the computer instructions stored in the storage medium corresponding to step: determining the second region on the display unit based on the first region, includes the following steps when being executed:

determining, on the display unit, a region overlapping with the first region as the second region if the display contents are a first type of information; or determining, on the display unit, a region not overlapping with the first region as the second region if the display contents are a second type of information different from the first type of information.

Optionally, the computer instructions stored in the storage medium corresponding to step: judging the type of the display contents, includes the following step when being executed:

judging whether the display contents are generated in response to an input operation from a user, determining the display contents to be the first type of information if it is judged that the display contents are generated in response to the input operation from the user, or determining the display contents to be the second type of information if it is judged that the display contents are generated not in response to the input operation from the user.

Optionally, the computer instructions stored in the storage medium corresponding to step: displaying the display contents in the second region, includes the following step when being executed:

maintaining a currently-displayed contents on the display unit and displaying the display contents in the second region, wherein a portion of the currently-displayed contents overlapping with a display location for the display contents are occluded by the display contents.

Optionally, the computer instructions stored in the storage medium corresponding to step: displaying the display contents in the second region, includes the following step when being executed:

displaying the display contents in the second region in a window corresponding to an application on which the user performs the input operation, if the display contents are generated in response to the input operation from the user.

Optionally, other computer instructions further stored in the storage medium are executed before the computer instructions corresponding to step: displaying the display contents in the second region in the window corresponding to the application on which the user performs the input operation, including the following step:

enlarging a display region of the window to enable the window with the enlarged display region to contain the second region if the window does not contain the second region.

Optionally, other computer instructions further stored in the storage medium are executed before the computer instructions corresponding to step: displaying the display contents in the second region in the window corresponding to the application on which the user performs the input operation, including the following step:

changing a display location of the window to enable the window to contain the second region and moving a region in the window predetermined for displaying the display contents to the second region, if the window does not contain the second region.

Optionally, other computer instructions further stored in the storage medium are executed before the computer instructions corresponding to step: displaying the display contents in the second region in the window corresponding to the application on which the user performs the input operation, including the following step:

terminating displaying an original contents in the second region or displaying the original contents in a third region other than the second region in the window, if the original contents is displayed on the second region in the window.

In the above, the preferred embodiments according to the present disclosure have been described. However, additional variations and modifications may be made to the embodiments by those skilled in the art once they learn the basic creative concept. Therefore, the appended claims intend to be explained to include the preferred embodiments and all the variations and modifications falling within the scope of the present disclosure.

It is obvious that various changes and variations may be made to the present disclosure by those skilled in the art, without departing from the spirit and scope of the present disclosure. In this case, if these changes and variations of the present disclosure belong to the scope of the claims of the present disclosure and the scope of techniques equivalent to the present disclosure, the present disclosure intends to contain these changes and variations therein.

The invention claimed is:

1. A display method, comprising:

detecting whether display contents are to be displayed via a display unit of an electronic device;

determining a first region on the display unit if it is detected that the display contents are to be displayed via the display unit of the electronic device, the first region corresponding to a gazing position of a user on the display unit;

determining a second region on the display unit based on the first region;

displaying the display contents in the second region;

wherein, before determining the second region based on the first region on the display unit, the method further comprises: judging the type of the display contents; and said determining the second region on the display unit based on the first region comprises:

determining, on the display unit, a region overlapping with the first region as the second region if the display contents are a first type of information; and determining, on the display unit, a region not overlapping with the first region as the second region if the display contents are a second type of information different from the first type of information; and wherein said judging the type of the display contents comprises: judging whether the display contents are generated in response to an input operation from a user, determining the display contents to be the first type of information if it is judged that the display contents are generated in response to the input operation from the user, and determining the display contents to be the second type of information if it is judged that the display contents are generated not in response to the input operation from the user.

2. The method according to claim 1, wherein said determining the second region on the display unit based on the first region comprises:
acquiring a display parameter of the display contents;
determining a second location parameter based on a first location parameter of the first region and the display parameter; and
determining the second region based on the second location parameter.

3. The method according to claim 1, wherein said displaying the display contents in the second region comprises:
maintaining a currently-displayed contents on the display unit and displaying the display contents in the second region, wherein a portion of the currently-displayed contents is occluded by the display contents in the case that the portion is overlapping with a display location for the display contents.

4. The method according to claim 1, wherein said displaying the display contents in the second region comprises:
displaying the display contents in the second region in a window corresponding to an application on which the user performs the input operation, if the display contents are generated in response to the input operation from the user.

5. The method according to claim 4, wherein, before displaying the display contents in the second region in the window corresponding to the application on which the user performs the input operation, the method further comprises:
enlarging a display region of the window to enable the window with the enlarged display region to contain the second region, if the window does not contain the second region.

6. The method according to claim 4, wherein before displaying the display contents in the second region in the window corresponding to the application on which the user performs the input operation, the method further comprises:
changing a display location of the window to enable the window to contain the second region and moving a predetermined region in the window for displaying the display contents to the second region, if the window does not contain the second region.

7. The method according to claim 4, wherein before displaying the display contents in the second region in the window corresponding to the application on which the user performs the input operation, the method further comprises:
if an original content is displayed on the second region in the window, terminating displaying the original content in the second region, or displaying the original content in a third region other than the second region in the window.

8. An electronic device, comprising:
a detection module configured to detect whether display contents are to be displayed via a display unit of the electronic device;
a first determination module configured to determine a first region on the display unit, the first region corresponding to a gazing position of the user on the display unit;
a second determination module configured to determine a second region on the display unit based on the first region;
a display module configured to display the display contents in the second region; and
the electronic device further comprises:
a judging module configured to judge the type of the display contents;
wherein the second determination module is configured to: determine a region overlapping with the first region on the display unit as the second region if the display contents are a first type of information; and determine a region not overlapping with the first region on the display unit as the second region if the display contents are a second type of information different from the first type of information; and
wherein the judging module is further configured to: judge whether the display contents are generated in response to an input operation from a user, determine the display contents to be the first type of information if the display contents are generated in response to the input operation from the user, and determine the display contents to be the second type of information if the display contents are generated not in response to the input operation from the user.

9. The electronic device according to claim 8, wherein the second determination module is configured to:
acquire a display parameter of the display contents;
determine a second location parameter based on a first location parameter of the first region and the display parameter; and
determine the second region based on the second location parameter.

10. The electronic device according to claim 8, wherein the display module is configured to: maintain a currently-displayed contents on the display unit and display the display contents in the second region; wherein a portion of the currently-displayed contents is occluded by the display contents in the case that the portion is overlapping with a display location for the display contents.

11. The electronic device according to claim 8, wherein the display module is configured to display the display contents in the second region in a window corresponding to an application on which the user performs the input operation, if the display contents are generated in response to the input operation from the user.

12. The electronic device according to claim 11, further comprising:
a first window adjustment module, configured to enlarge a display region of the window to enable the window with the enlarged display region to contain the second region, if the window does not contain the second region.

13. The electronic device according to claim 11, further comprising:
a second window adjustment module, configured to change a display location of the window to enable the window to contain the second region and move a predetermined region in the window for displaying the display contents to the second region, if the window does not contain the second region.

14. The electronic device according to claim 11, further comprising:
display contents adjustment module, configured to terminate displaying an original content in the second region or display the original content in a third region other than the second region in the window, if the original content is displayed on the second region in the window.

15. The electronic device according to claim 8, wherein the first and second determination modules constitute a single processor.

* * * * *